United States Patent
Chiang

(10) Patent No.: US 9,888,510 B2
(45) Date of Patent: Feb. 6, 2018

(54) MOBILE PEER-TO-PEER CONTENT SHARING METHOD AND SYSTEM

(71) Applicant: EMPIRE TECHONOLGY DEVELOPMENT LLC, Wilmington, DE (US)

(72) Inventor: Mung Chiang, Cherry Hill, NJ (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/994,266

(22) Filed: Jan. 13, 2016

(65) Prior Publication Data

US 2016/0128125 A1 May 5, 2016

Related U.S. Application Data

(60) Continuation of application No. 13/784,850, filed on Mar. 5, 2013, now Pat. No. 9,277,348, which is a
(Continued)

(51) Int. Cl.
*H04W 76/02* (2009.01)
*H04L 29/08* (2006.01)
(Continued)

(52) U.S. Cl.
CPC ....... *H04W 76/023* (2013.01); *H04L 67/1078* (2013.01); *H04L 67/1082* (2013.01);
(Continued)

(58) Field of Classification Search
CPC ... H04W 76/023; H04W 4/005; H04W 84/18; H04L 67/1078; H04L 67/1082; H04L 67/104
See application file for complete search history.

(56) References Cited

U.S. PATENT DOCUMENTS 7,689,510 B2 * 3/2010 Lamkin ............ G06F 17/30041
705/51
7,849,420 B1 12/2010 Amidon et al.
(Continued)

FOREIGN PATENT DOCUMENTS

EP 2048855 A2 4/2009
JP 2002171283 A 6/2002
(Continued)

OTHER PUBLICATIONS http://www.qualcomm.com/innovation/research/ (redirected from www.flarion.com), printed on Jul. 13, 2010.
(Continued)

*Primary Examiner* — Min Jung
(74) *Attorney, Agent, or Firm* — Turk IP Law, LLC

(57) ABSTRACT

Embodiment of the disclosure set forth methods for sharing data in a wireless network. Some example methods include storing in a database a content related information associated with a first mobile device, receiving a request for the content related information from a second mobile device, searching the database for the content related information, and transmitting a search result to the second mobile device to enable the transfer of content between the first mobile device and the second mobile device.

7 Claims, 13 Drawing Sheets

Related U.S. Application Data division of application No. 12/390,506, filed on Feb. 23, 2009, now Pat. No. 8,406,206.

(51) Int. Cl.
| | | |
|---|---|---|
| *H04W 88/18* | (2009.01) | |
| *H04W 4/00* | (2009.01) | |
| *H04W 84/18* | (2009.01) | |
| *H04W 92/18* | (2009.01) | |

(52) U.S. Cl.
CPC ......... *H04W 4/005* (2013.01); *H04W 88/182* (2013.01); *H04W 84/18* (2013.01); *H04W 92/18* (2013.01)

(56) References Cited

U.S. PATENT DOCUMENTS

| | | | |
|---|---|---|---|
| 7,937,362 | B1 | 5/2011 | Lian et al. |
| 8,131,272 | B2* | 3/2012 | Paalasmaa ............. G06Q 10/10 |
| | | | 455/414.1 |
| 8,406,206 | B2 | 3/2013 | Chiang |
| 8,583,164 | B2 | 11/2013 | Marcinkiewicz |
| 9,195,996 | B1* | 11/2015 | Walsh ................... H04L 12/588 |
| 2005/0203801 | A1 | 9/2005 | Morgenstern et al. |
| 2006/0146765 | A1* | 7/2006 | Van De Sluis ......... G06F 3/016 |
| | | | 370/338 |
| 2007/0105577 | A1* | 5/2007 | Bonta ............... H04L 29/06027 |
| | | | 455/517 |
| 2008/0034064 | A1* | 2/2008 | Choi ........................ G06F 21/10 |
| | | | 709/219 |
| 2008/0069047 | A1* | 3/2008 | Yee ..................... H04W 76/023 |
| | | | 370/331 |
| 2008/0089299 | A1 | 4/2008 | Lindsley et al. |
| 2008/0120416 | A1 | 5/2008 | Hopkins et al. |
| 2008/0172291 | A1 | 7/2008 | Hurowitz et al. |
| 2008/0208976 | A1 | 8/2008 | Chapalamadugu et al. |
| 2009/0083148 | A1 | 3/2009 | Hwang et al. |
| 2009/0111378 | A1* | 4/2009 | Sheynman ............ H04W 8/005 |
| | | | 455/41.1 |
| 2009/0210328 | A1 | 8/2009 | Fomenko et al. |
| 2009/0258656 | A1 | 10/2009 | Wang et al. |
| 2010/0011103 | A1 | 1/2010 | Luzzatti et al. |
| 2010/0057924 | A1 | 3/2010 | Rauber et al. |
| 2010/0151851 | A1 | 6/2010 | Bhatia et al. |
| 2010/0208590 | A1* | 8/2010 | Dolganow ............ H04L 43/026 |
| | | | 370/235 |
| 2013/0182597 | A1 | 7/2013 | Chiang |

FOREIGN PATENT DOCUMENTS

| | | |
|---|---|---|
| JP | 2002318720 A | 10/2002 |
| JP | 2004172818 A | 6/2004 |
| JP | 2006287394 A | 10/2006 |
| JP | 2008234206 A | 10/2008 |

OTHER PUBLICATIONS

Chung-Ming Huang et al., "Network-Aware P2P File Sharing over the Wireless Mobile Networks," IEEE Journal on Selected Areas in Communications, Jan. 2007, pp. 204-210, vol. 25, No. 1.

Sheng Zhong et al., "Sprite: A Simple, Cheat-Proof, Credit-Based System for Mobile Ad-Hoc Networks," IEEE INFOCOM, 2003, pp. 11.

* cited by examiner

1000 A computer program product

1004 A signal bearing medium 1002 at least one of one or more instructions for storing in a database a content related information associated with a first mobile device;

one or more instructions for receiving a request for the content related information from a second mobile device;

one or more instructions for searching the database for the content related information; or one or more instructions for transmitting a search result to the second mobile device enabling the transfer of content between the first mobile device and the second mobile device

| 1006 a computer readable medium | 1008 a recordable medium |

FIG. 10

MOBILE PEER-TO-PEER CONTENT SHARING METHOD AND SYSTEM

CROSS-REFERENCE TO RELATED APPLICATIONS

The present application is a continuation application under 35 U.S.C. § 120 of the U.S. patent application Ser. No. 13/784,850, filed on Mar. 5, 2013, now U.S. Pat. No. 9,277,348, which is a divisional application under 35 U.S.C. § 121 of U.S. patent application Ser. No. 12/390,506, filed on Feb. 23, 2009, now U.S. Pat. No. 8,406,206, and entitled "MOBILE PEER-TO-PEER CONTENT SHARING METHOD AND SYSTEM." U.S. Pat. No. 9,277,348 and U.S. Pat. No. 8,406,206, including any appendices or attachments thereof, are incorporated by reference herein in their entirety.

BACKGROUND OF THE DISCLOSURE

As mobile devices become ubiquitous and affordable, they are also being transformed from a simple communication tool to an information and entertainment center. For example, mobile devices are often used to access the various assets on the Internet, such as information, bandwidth, and computing resources. There are existing approaches that attempt to advance mobile peer-to-peer (P2P) computing or networking technologies to further augment the utilization of these Internet assets and enable the mobile devices to share resources directly with one another. However, with the inherent mobile nature of the mobile devices, many of these approaches are faced with adoption issues.

SUMMARY OF THE DISCLOSURE

A mobile peer-to-peer content sharing method and system is disclosed. One embodiment of the disclosure sets forth a method for sharing data in a wireless network. The method includes the steps of establishing a topology of the wireless network, storing location and content related information associated with a first mobile device in the wireless network in a database, searching the database for the content related information in response to a content request associated with a second mobile device in the wireless network, and transmitting a search result to the second mobile device for the transfer of the content between the first mobile device and the second mobile.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 10 is a block diagram illustrating a computer program product of a software module for a MS, a BS, or a MSC, all arranged in accordance with embodiments of the present disclosure.

DETAILED DESCRIPTION

Figure 1A:
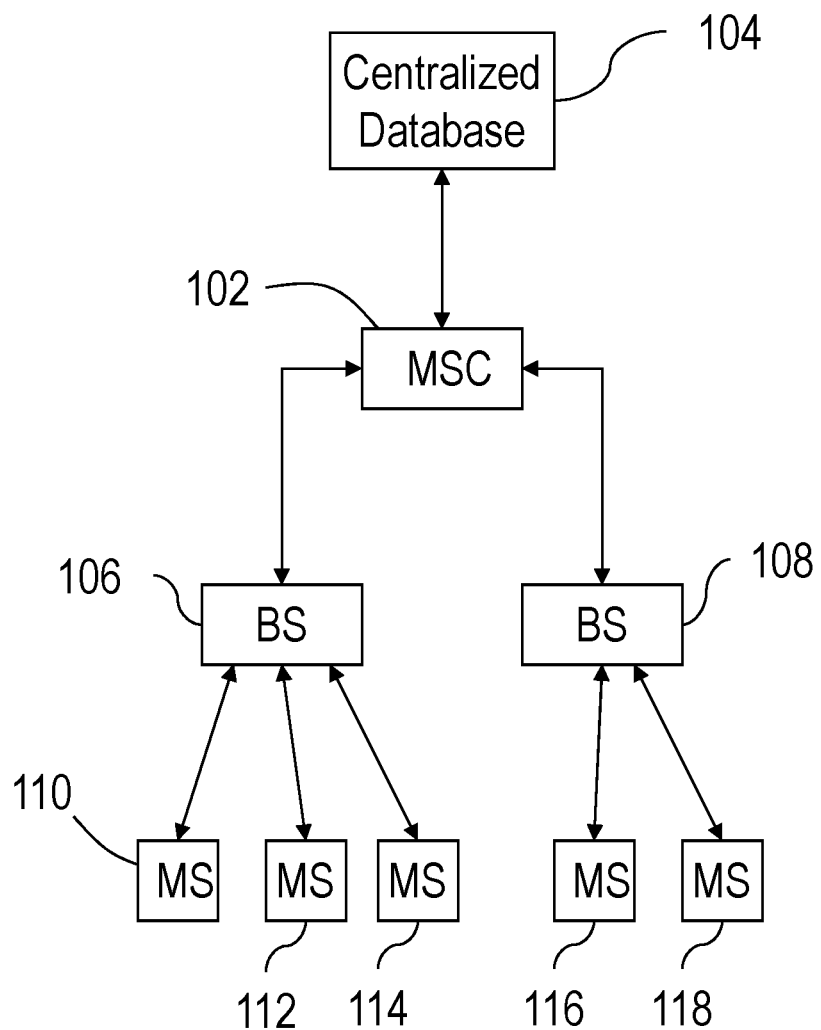
FIG. 1A illustrates one configuration of a P2P wireless network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs, and systems related to peer-to-peer content sharing in a wireless network.

In this disclosure, a wireless network that supports peer-to-peer (P2P) technologies (also referred to as P2P wireless network or P2P mobile network) may be used to build a wide range of distributed services and applications. Any device with wireless connectivity and addressable in the P2P wireless network is referred to as a peer. A wireless network generally includes at least one stationary device and at least one mobile station (MS). Some examples of a stationary device include, without limitation, a base station (BS) and a mobile switch center (MSC). A BS is configured to cover a wireless range, and a MSC is configured to manage one or more BS's in a wireless network. A MS generally refers to a portable device with wireless connectivity. Some examples of a MS include, without limitation, a mobile phone, a personal digital assistant (PDA), a laptop computer with wireless connectivity, and a personal game console with wireless connectivity. A mesh network refers to a network with nodes that communicate directly with each other through wireless connections. Instead of going through a designated router, data packets in a mesh network are forwarded from node to node in a process typically termed "hopping."

FIG. 1A illustrates one configuration of a P2P wireless network 100, arranged in accordance with the embodiments of the present disclosure. The P2P wireless network 100 includes a MSC 102, a centralized database 104, a plurality of BS's (e.g., BS 106 and BS 108), and a plurality of MS's (e.g., MS 110, MS 112, MS 114, MS 116, and MS 118). The MS's of FIG. 1A are also considered as peers in the P2P wireless network 100. The wireless technology used in the P2P wireless network 100 may include, without limitation, wide area cellular technology (e.g., 3G and 4G), wireless networking technology (e.g., Wireless Fidelity or Wi-Fi, Worldwide Interoperability for Microwave Access or WiMAX, and Third Generation Partnership Project (Long Term Evolution) or 3GPP LTE).

In FIG. 1A, the MSC 102 is configured to manage the BS 106 and the BS 108. The BS 106 and the BS 108 are configured to communicate with the MS's that are in their respective communication ranges. The MSC 102 is coupled to the centralized database 104 and can access the centralized database 104. The centralized database 104 may be physically located within or external to the MSC 102. The centralized database 104 is arranged to store data received from the BS's and the MS's. Some examples of the stored data include, without limitation, identification of a MS, location of a MS, the relationship between a BS and a MS, identification of a BS, and content related information (e.g., availability of content, a tag associated with content, a key word describing content, and size of content). In one implementation, the identification of a MS may refer to an Internet Protocol (IP) address or a Media Access Control (MAC) address assigned to the MS.

A BS, such as the BS 106 covering the MS 110, MS 112, and MS 114, is configured to maintain communication links with the MS's and query the MS's for certain state information. Also, the BS 106 is configured to distribute data to any of the MS 110, MS 112, and MS 114. Since the BS 106 reports information back to the MSC 102 and the MSC 102 maintains the reported information in the centralized database 104, with access to the centralized database 104, the MSC 102 is able to keep track of the topology of the P2P wireless network 100 and the relationships among the peers in the network.

Figure 1B:
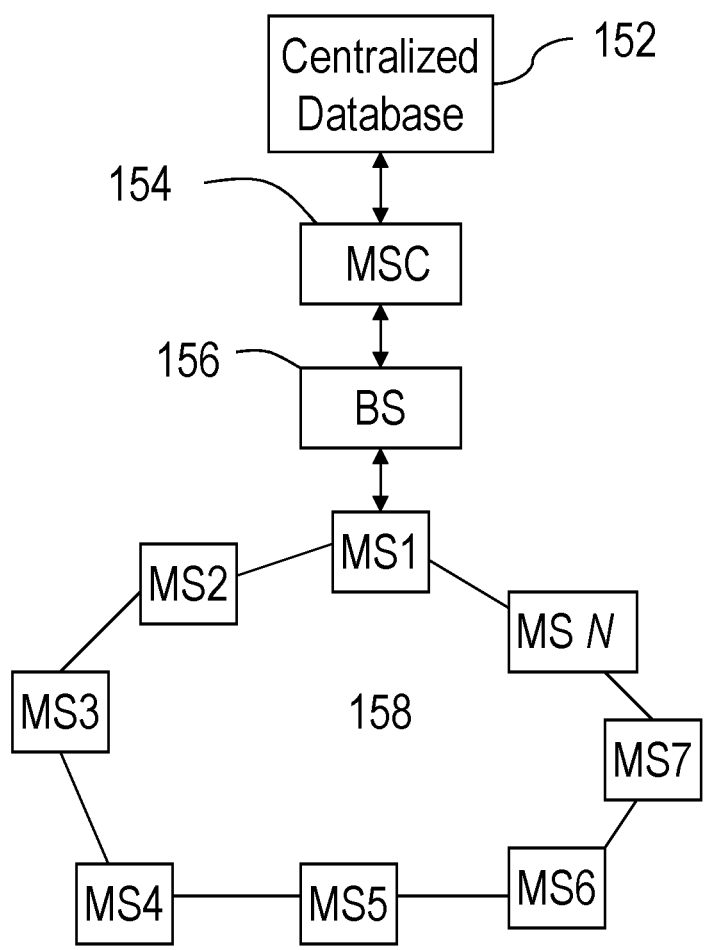
FIG. 1B illustrates a configuration of another P2P wireless network.

FIG. 1B illustrates a configuration of another P2P wireless network 150, arranged in accordance with embodiments of the present disclosure. Here, the N MS's are coupled to one another in a mesh network 158, where one of the MS's, MS1, is connected to a BS 156. The MS's are peers in the P2P wireless network 150. In some implementations, the N peers can exchange data with each other in the mesh network 158 without going through the BS 156. To increase redundancy and mitigate losing connections to the peers as each peer moves from one coverage area to another, one approach is to increase the number of N as a function of the historical data on properties of MS. The value of N can be adaptively determined by the following equation:

$$N = alpha * T1 + beta$$

where alpha and beta are constants determined by the MSC 154. Using MS N as an example, T1 is the average duration of time that the MS N stays in an area covered by the same MSC 154 after the MS N makes the initial contact with the MSC 154.

In some implementations, when a MS in a P2P wireless network seeks to retrieve content from a peer, the MS looks to an appropriate MSC for the current information regarding the availability and the location of the requested content. For the MSC to obtain and disseminate such information, various mechanisms are implemented. Using the P2P wireless network 100 of FIG. 1A as an example, one mechanism is for the MSC 102 to discover all the MS's that are covered by the BS's managed by the MSC 102 (e.g., BS 106 and BS 108) and exchange data with the MS's through the BS's. Another example mechanism is for the MSC 102 to search the centralized database 104 in response to receiving a content request from a MS. Still another mechanism is for the MSC 102 to query the peers in the P2P wireless network, keep the state information associated with the peers up to date, and respond to changing state information, if any. Detailed discussions of these mechanisms are provided in the subsequent paragraphs.

Figure 2A:
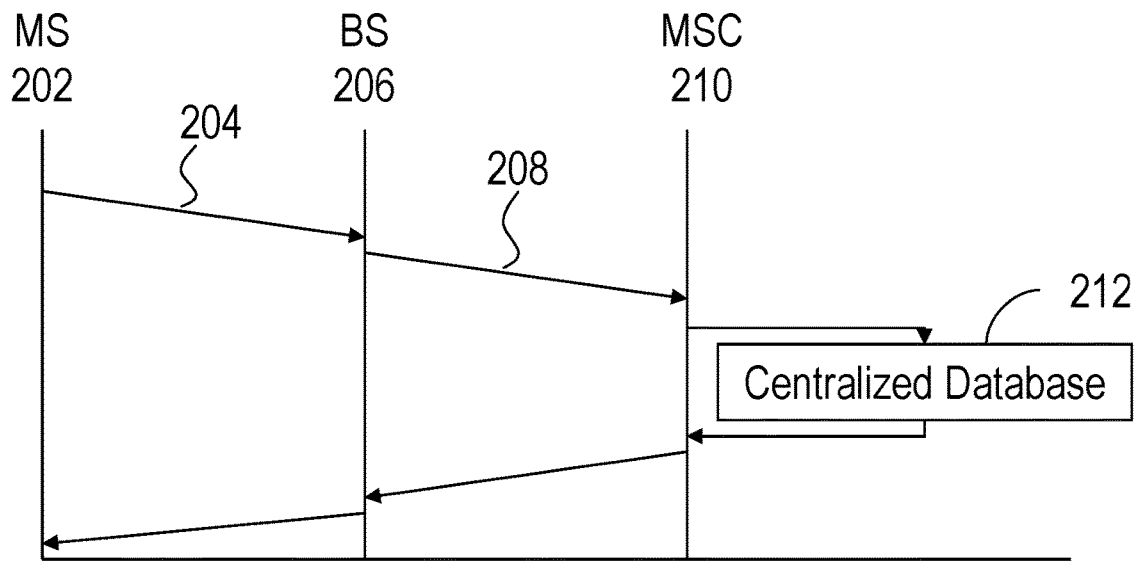
FIG. 2A is a timing diagram illustrating a sequence of discovering a peer in a P2P wireless network and sending information to the peer by a MSC.

FIG. 2A is a timing diagram illustrating a sequence of discovering a peer in a P2P wireless network and sending information to the peer by a MSC, arranged in accordance with embodiments of the present disclosure. In some implementations, when a MS 202 is in an area covered by a BS 206, the MS 202 transmits a join request signal 204 to the BS 206, which then sends an update signal 208 to a MSC 210. The join request signal 204 may include the identification and the location information of the MS 202. When the MSC 210 receives the update signal 208 from the BS 206, the MSC 210 stores the received information to a centralized database 212. The MSC 210 may also process the received information, such as, without limitation, establishing an appropriate number of peers to form a mesh network in the P2P wireless network as mentioned above. Then, the MSC 210 transmits information, such as, without limitation, the established number of peers and/or the status of connection between the MSC 210 and the MS 202, to the MS 202 via the BS 206.

Figure 2B:
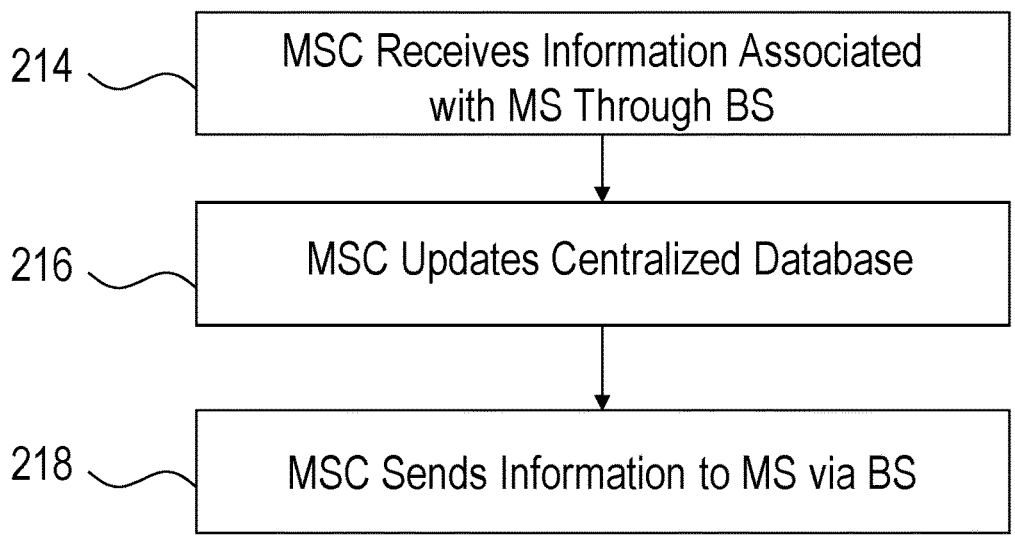
FIG. 2B is a flow chart illustrating a process performed by a MSC in response to a MS entering a coverage area of a BS managed by the MSC.

In conjunction with FIG. 2A, FIG. 2B is a flow chart illustrating a process performed by a MSC in response to a MS entering a coverage area of a BS managed by the MSC, arranged in accordance with embodiments of the present disclosure. In operation 214, the MSC 210 receives information associated with the MS 202 through the update signal 208 from the BS 206. The MSC 210 then in operation 216 stores the received information in the centralized database 212 and may also process the received information. In operation 218, the MSC 210 sends information indicative of the peering information in the P2P wireless network and/or connection status, for example, to the MS 202 via the BS 206.

Figure 3:
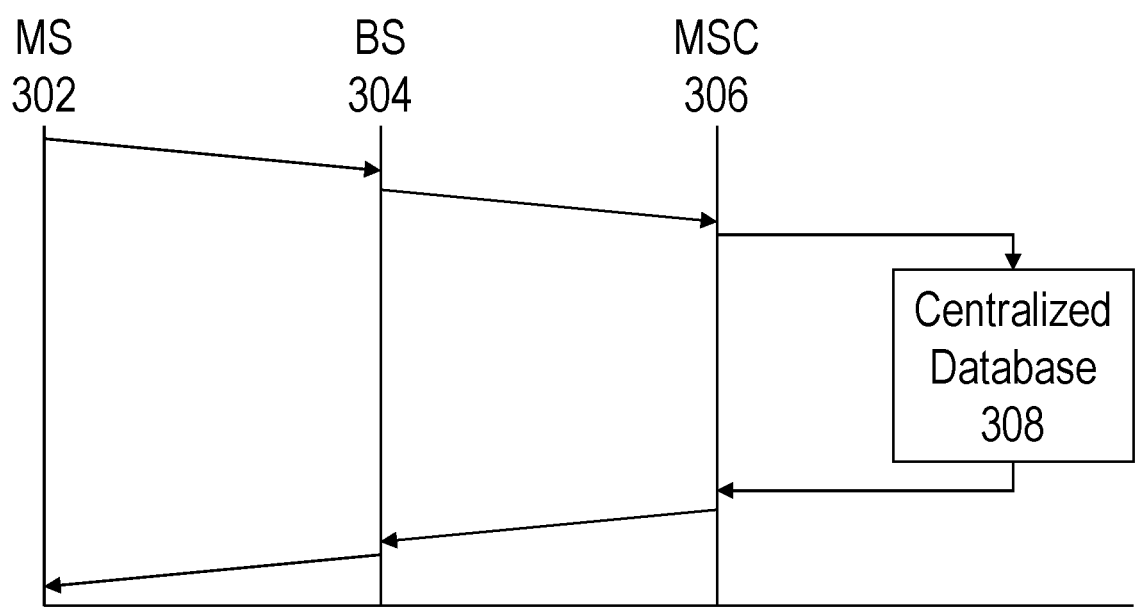
FIG. 3 is a timing diagram illustrating a content request sequence.

After a MSC and a MS exchange data, FIG. 3 is a timing diagram illustrating a content request sequence, arranged in accordance with embodiments of the present disclosure. Suppose a MSC 306 has discovered a MS 302 and has stored information received from the MS 302 in a centralized database 308 via a BS 304. In some implementations, the MS 302 requests for content by transmitting an inquire signal to the BS 304, which then forwards the inquire signal to the MSC 306. The inquire signal may include certain information associated with the requested content, such as a keyword, a tag, and size information. After receiving the inquire signal, the MSC 306 searches in the centralized database 308 for the requested content and also the identities of the one or more MS's that have the content. The MSC 306 then sends a reply signal with the search results to the BS 304, which relays the reply signal to the MS 302. The reply signal may include, without limitation, the location of the MS having the requested content and the identification of the BS covering such a MS. It should be noted that the aforementioned content request sequence also covers scenarios in which the requested content resides in more than one MS.

Especially given the mobility nature of MS's, state information associated with a MS does not typically remain static. Some examples of the state information include, without limitation, location, content availability, transmission capability, and use associated with a MS.

Figure 4A:
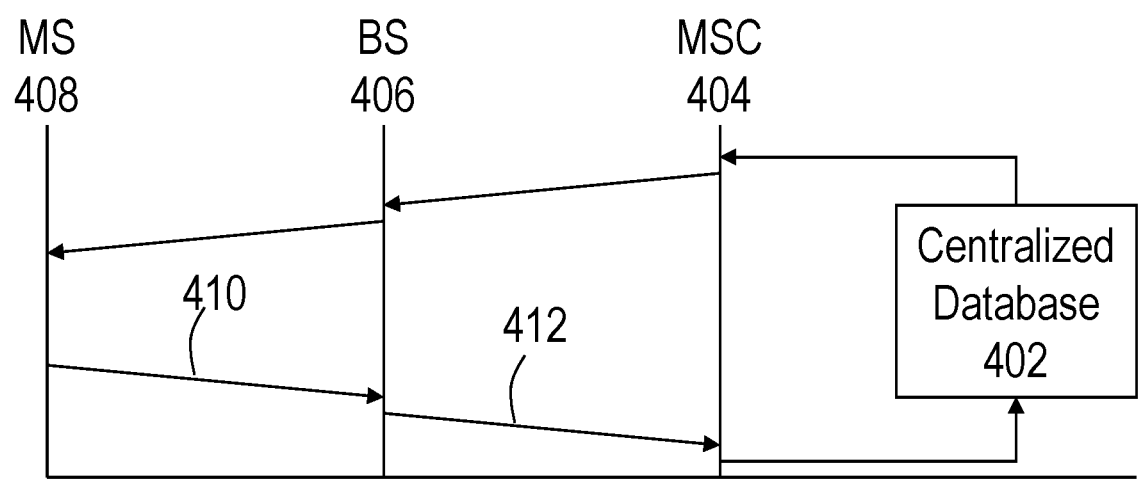
FIG. 4A is a timing diagram illustrating a sequence for keeping the state information of a MS current in a centralized database.

FIG. 4A is a timing diagram illustrating a sequence for keeping the state information of a MS current in a centralized database 402, arranged in accordance with embodiments of the present disclosure. The centralized database 402 is generally configured to receive the state information of a MS through a MSC 404. In some implementations, the MSC 404 issues a query signal from time to time to a BS 406 requesting for state information associated with a MS 408. The BS 406 relays the query signal to the MS 408. In response, the MS 408 sends a reply signal 410 to the BS 406, and the BS 406 then sends an update signal 412 to the MSC 404. The reply signal 410 and the update signal 412 both include the current state information associated with the MS 408. Alternatively, the state information of the MS 408 can be maintained and kept current by the BS 406.

Figure 4B:
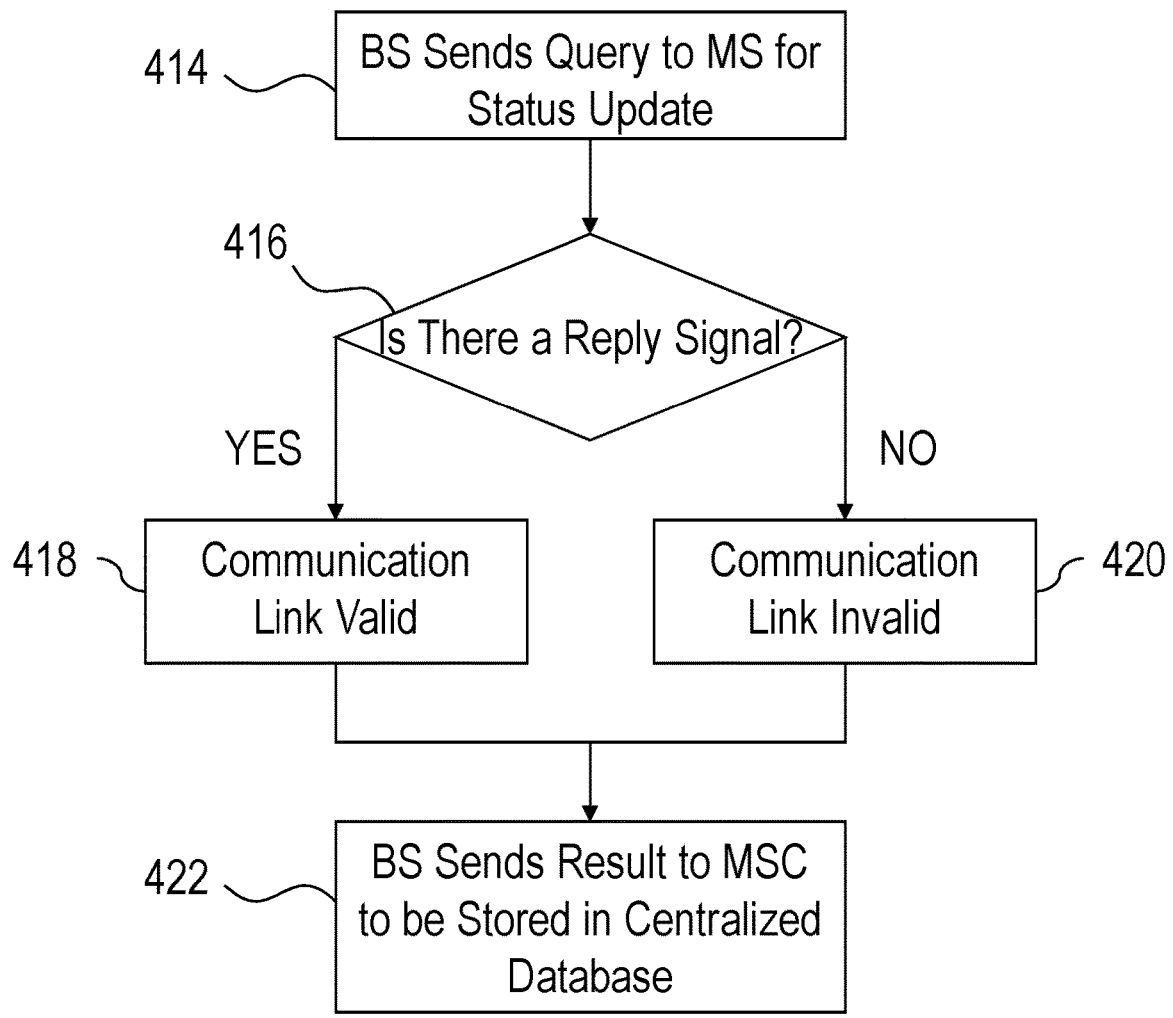
FIG. 4B is a flow chart further illustrating a process for maintaining the state information of a MS.

From the perspective of a BS, FIG. 4B is a flow chart further illustrating a process for maintaining the state information of a MS, arranged in accordance with embodiments of the present disclosure. In conjunction with FIG. 4A, in response to a query signal from the MSC 404, the BS 406 transmits a query signal to the MS 408 for a status update in operation 414. In operation 416, the BS 406 waits for the reply signal 410 from the MS 408 to determine the connection status with the MSC 404. If the reply signal 410 is received, then the BS 406 establishes that the communication link with the MS 408 is still valid in operation 418. On the other hand, if the reply signal 410 is not received by the BS 406, then the BS 406 determines that the communication link with the MS 408 is no longer valid in operation 420. In operation 422, the BS 406 reports the determination results, such as the communication link status, back to the MSC 404 to be stored in the centralized database 402.

In some implementations, when a communication link associated with a MS is determined to be invalid (e.g., the MS moving into a different area covered by another BS), the process of peer discovery as illustrated in FIGS. 2A and 2B and discussed above is re-initiated, and the state information obtained prior to the invalidity determination of the communication link is abolished.

In some examples, the process of polling and dissemination of control information in a P2P wireless network can be streamlined by utilizing existing control signal paths between a MS and a BS. Using FIG. 4A as an example, suppose the MS 408 sends a join request to the BS 406 via an established control signal path in a first scenario (e.g., the MS 408 awaking from a sleeping mode and requesting to establish a new data connection with the BS 406.) In some implementations, the MS 408 can also utilize the same control signal path to send the content request in a second scenario (e.g., the MS 408 requesting for certain content). In other words, the MS 408 does not need to establish a control signal path specifically for sending the content request. The piggybacking of the existing control signal paths to poll and disseminate data simplifies communications, prevents possible packet collisions, and conserves power for the peers in the P2P wireless network.

As a MS moves from one area covered by a first BS to another area covered by a second BS in a P2P wireless network, certain data information associated with the BS is also transferred from the first BS to the second BS to maintain the connectivity of the MS to the P2P wireless network. This data transfer process is generally referred to as a handoff.

Figure 5A:
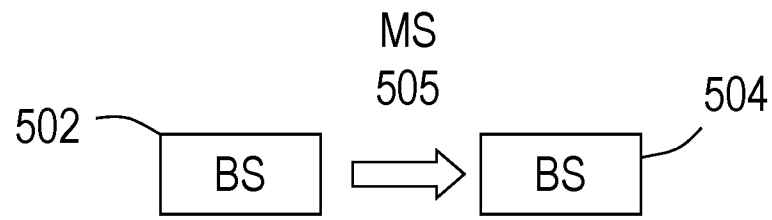
FIG. 5A illustrates one type of handoff.

FIG. 5A illustrates one type of handoff, arranged in accordance with embodiments of the present disclosure. Here, as a MS 505 moves from a first coverage area of a BS 502 into a second coverage area of a BS 504, the connection between the MS 505 and the BS 502 is broken, and a new connection between the MS 505 and BS 504 is established. The BS 504 also receives directly from the BS 502 a set of content sharing information associated with the MS 505 to minimize any disruption to the communication session conducted by the MS 505 via the BS 502. This process of transferring control from one BS to another is referred to as a hard handoff.

Figure 5B:
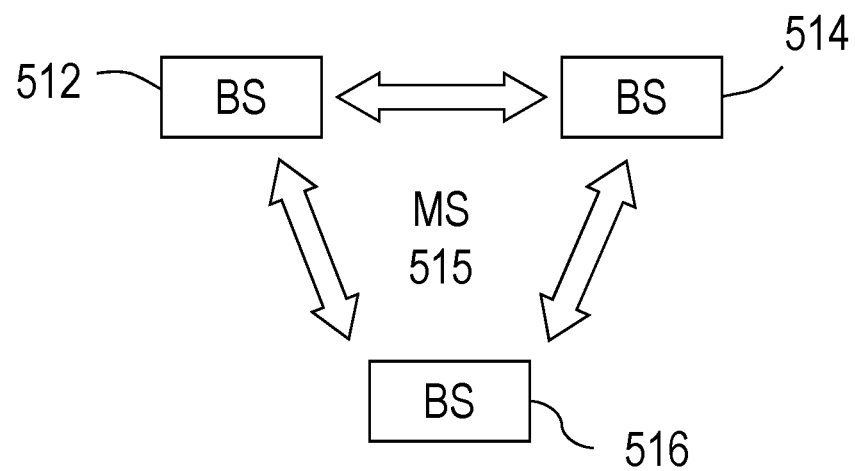
FIG. 5B illustrates another type of a handoff.

FIG. 5B illustrates another type of a handoff, arranged in accordance with embodiments of the present disclosure. Unlike the hard handoff discussed above, the three BS's, a BS 512, a BS 514, and a BS 516 communicate with one another from time to time and try to keep the set of content sharing information associated with a MS 515 current. Moreover, when the MS 515 indeed moves from one coverage area of the BS 512 into another coverage area of the BS 514, the connection between the MS 515 and the BS 512 is retained while a new connection between the MS 515 and the BS 514 is established. The interval, during which the two connections are used in parallel, may be brief. This process of transferring control is referred to as a soft handoff. With the three BS's sharing the current content sharing information of the MS 515, the soft handoff approach is useful to a MS that frequently moves in and out of the coverage areas of different BS's.

In addition, the aforementioned peer discovery process is re-initiated, so that a MSC managing the BS 502 and the BS 504 can re-establish connection with the MS 505 at its new location. Some examples of the set of content sharing information transferred in the handoff from the BS 502 to the BS 504 may include, without limitation, location of the MS 505, identification of the MS 505, and relevant information regarding the content that the MS 505 may be transferring or has transferred at the time of the handoff.

Having described several mechanisms used in a centralized control plane for a P2P wireless network, in one implementation, the data plane for the P2P wireless network is designed to support both a distributive model and a centralized model. Using the transfer of certain requested content as an example, if a first MS with the requested content and a second MS making the request are sufficiently close to each other, then in some implementations, the first MS transfers the content directly to the second MS. In other words, the content transfer occurs directly between two peers. This is an example of the distributive model for the data plane. On the other hand, if the two MS's are not close to each other, then the first MS sends the content to the appropriate BS for it to send to the second MS. In other words, the content transfer occurs indirectly (i.e., via the BS) between the two peers. This is an example of the centralized model for the data plane.

Figure 6:
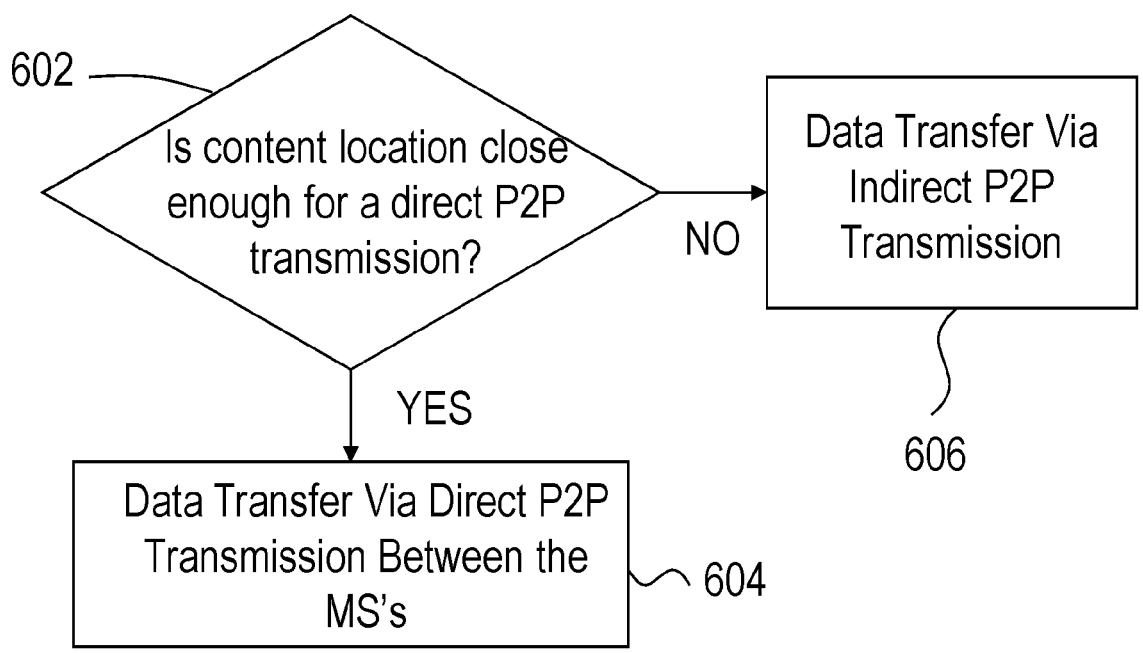
FIG. 6 is a flow chart illustrating a process for handling data transfer among peers in a P2P wireless network.

FIG. 6 is a flow chart illustrating a process for handling data transfer among peers in a P2P wireless network, arranged in accordance with embodiments of the present disclosure. In operation 602, after a first MS making the request for content receives the location of a second MS with the requested content, the first MS determines whether the content location of the second MS is close enough to establish a direct P2P transmission. In some example implementations, the first MS establishes a distance between the first MS and the second MS and compares the distance against a threshold value. If the distance is sufficiently close (i.e., distance is less than the threshold value), then in operation 604, the two MS's establish a direct communication with each other so that data transfer for the requested content is accomplished via a direct P2P transmission between the two MS's. However, if the first MS determines that the distance is not close enough based on the threshold value, then in operation 606, the two MS's establish an indirect communication so that data transfer is accomplished for the requested content by an indirect P2P transmission through at least one BS. In other implementations, the method of content transfer comprises: receiving, by a second device, a request for information related to a first content; determining, by the second device, if a direct communication between a first device and the second device can be established, wherein the direct communication between the first device and the second device can be established if a distance between the first device and the second device is less than a threshold value; if the direct communication between the first device and the second device can be established, sending, by the second device, the information related to the first content via the direct communication between the first device and the second device; and if the direct communication between the first device and the second device cannot be established, sending, by the second device, the information related to the first content via an indirect communication between the first device and the second device, wherein the indirect communication between the first device and the second device is made through a third device. The technologies that can be used for the direct transmission between the peers include, without limitation, utilizing an existing WLAN communication link in an ad hoc network and using direct communication through the cellular network frequency range.

During the data transfer from two peers in a P2P wireless network, data may be divided into multiple chunks. Transferring chunks of content, as opposed to the entire content, should increase transmission efficiency and minimize data losses due to connection failures. In some implementations, the size of each chunk is an increasing function of the numbers of the MS's covered by a BS in the P2P wireless network and also the average duration in which the MS's are linked to the BS. One equation to determine the chunk size is as follow:

$$K = \text{gamma} * T2$$

where K is the chunk size; gamma is a pre-determined constant; and T2 is the average duration in which the MS's are linked to the BS. These parameters are related to whether a connection for transferring content is stable or not. If the communication link is determined to be stable, then a larger sized chunk can be transferred. Otherwise, a smaller sized chunk can be transferred, since the connection is more likely to suffer failures. With smaller sized chunks, substantial waste of transmission can be avoided, especially if the connection failure occurs during the transmission of a chunk.

Yet another transmission scheme makes use of the inherent broadcast medium in a P2P wireless network. In some example implementations, a BS inserts a header to identity the type of content. For example, the header may include a short description or a key word associated with the content. Then, the BS broadcasts the header and the content to the MS's that are within the coverage area of the BS. A MS in the coverage area can decide whether to download the content based on the header information. In addition, the MS may also further decipher the header information and retrieve the location of the content and use the location information to quickly download of the content.

In addition to efficiently and reliably transmitting content in a P2P wireless network, another possible contributing factor to drive adoption is to ensure richness of content in the P2P wireless network.

In some approaches, a MS covered by a particular BS and with content is given incentives to initiate uploading of the content to the BS whenever it is in an advantaged position. This MS with the content is referred to as a producer MS. One way to determine whether the producer MS is in an advantage position is based on its channel condition.

Figure 7:
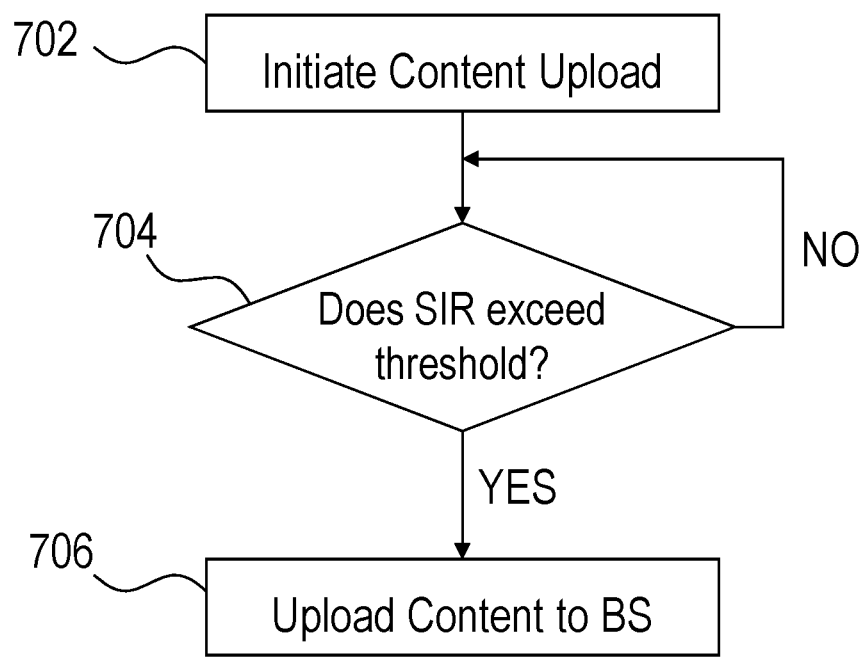
FIG. 7 is a flow chart illustrating a process of uploading content to a BS.

FIG. 7 is a flow chart illustrating a process of uploading content to a BS, arranged in accordance with embodiments of the present disclosure. Without having received any requests from a P2P wireless network for the content, a MS in operation 702 initiates the uploading of the content. The MS may be given certain incentives to initiate proactively. In operation 704, a signal-to-interference ratio (SIR) associated with the MS is determined and compared to a pre-determined threshold. The SIR measures the ratio of a received signal strength (S) to a total received interference strength (I). If the SIR is high (e.g., at or above the pre-determined threshold), then the channel condition is likely more suitable for transmission than if the SIR is low (e.g., below the pre-determined threshold). If the channel condition is good, then the upload speed can also be high. Here, if the SIR exceeds the pre-determined threshold, then the MS is considered to be in an advantageous position, and the uploading of the content to the BS can begin in operation 706. On the other hand, if the threshold is not reached, then the SIR is re-calculated until reaching the threshold. In some implementations, the MS is configured to track the number of attempts to check the SIR and then terminate the process shown in FIG. 7 for failing to exceed the pre-determined threshold within a certain number of attempts.

To encourage content upload, one incentive mechanisms is to offer rewards for contributing content and spending power to upload content. In some implementations, rewards may be provided in the form of virtual money, also referred to as a token. Alternatively, rewards can also be real money and can be added or deduced in a monthly payment bill. In some example implementations, a MS contributing content receives a token when the content is downloaded by other MS's. To reward the content contributor, the incentive mechanism charges a content requester for the content that it receives.

Figure 8:
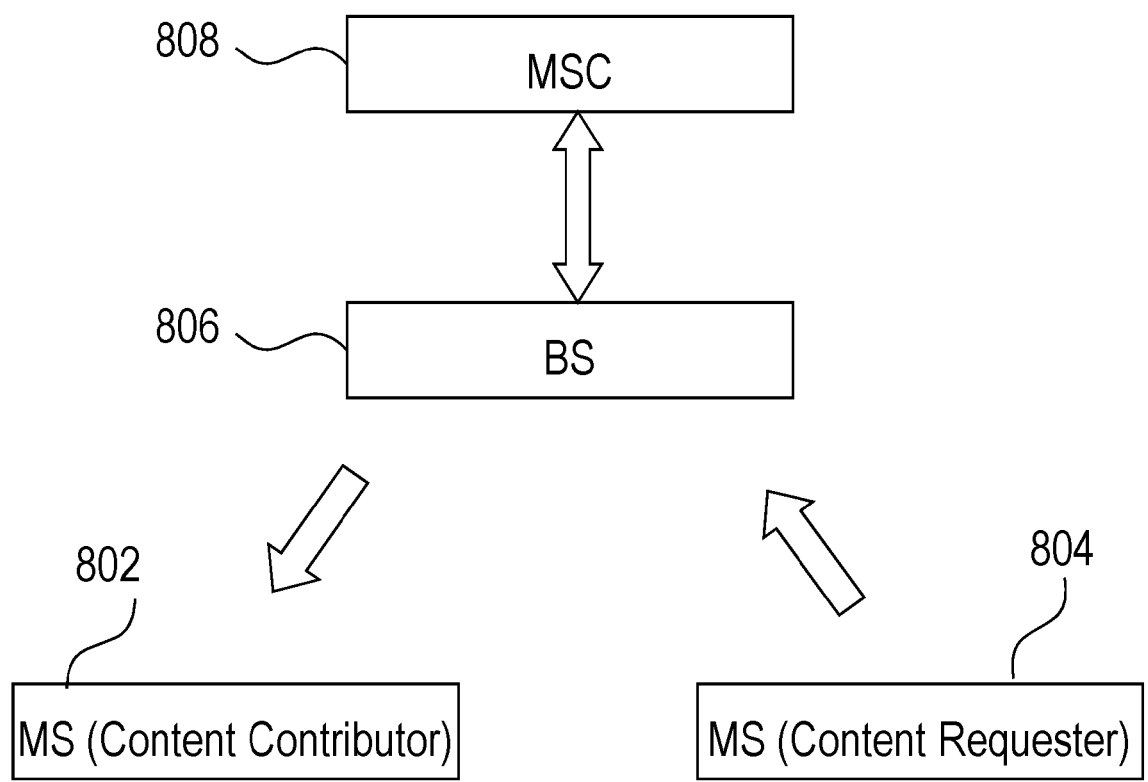
FIG. 8 is a simplified diagram illustrating a virtual money path in an incentive mechanism for a P2P wireless network.

FIG. 8 is a simplified diagram illustrating a virtual money path in an incentive mechanism 800 for a P2P wireless network, arranged in accordance with embodiments of the present disclosure. In some example implementations, a BS 806 covering one or more MS's, such as a first MS 802 and a second MS 804, is responsible for distributing and collecting virtual money, such as tokens. Moreover, a MSC 808 manages the number of tokens to be controlled by the BS 806, and the BS 806 may update the MSC 808 from time to time regarding whether the MS's are sufficiently incentivized to upload data or appropriately charged to receive data.

It is worth noting that the illustrated virtual money path and the data path (not shown) in the P2P wireless network are in opposite directions of each other. When a first MS 802 (a content contributor) uploads content in one direction to the BS 806, the first MS 802 receives a number of tokens based on the number of times the content is downloaded from the BS 806 in another direction. When a second MS 804 (a content requester) requests for certain content, the second MS 804 pays a certain number of tokens to the BS 806 to download the content. The number of tokens, as mentioned above, is determined by the MSC 808.

For some examples the content may go through more than one BS (though not shown in FIG. 8) for the first MS 802 to deliver the content to the second MS 804. When these BS's are also managed by the MSC 808, the MSC 808 allocates a certain number of tokens for each of the BS's along the path to distribute to its covered MS's.

To minimize potentially unfair outcome in the incentive mechanism, a transmit power based credit system may be used to discourage aggressive content uploading. When a MS aggressively uploads content to a BS to maximize the rewards received, such an action may interfere with other MS's from uploading to the BS. These MS's may be in advantaged positions to efficiently upload their respective content. These MS's may also have more desirable content. In some implementations, a transmit power based credit system can be utilized to determine the number of tokens awarded to a MS that uploads content based on the transmit power of the MS. For example, if the transmit power of a MS is high, then the MS may receive a smaller number of tokens. With high transmit power, the MS may transmit more content and thus may be seen as a potential candidate for aggressive content uploading. Also, the high transmit power of the MS may interfere with other content sharing transmissions. On the other hand, a MS with lower transmit power may receive a larger number of tokens. The larger token reward is meant to encourage the MS's with lower transmit power to upload content to the BS, since such MS's are likely to be in advantaged positions of the network. The transmit power of a MS can be determined by a BS covering the MS.

Figure 9A:
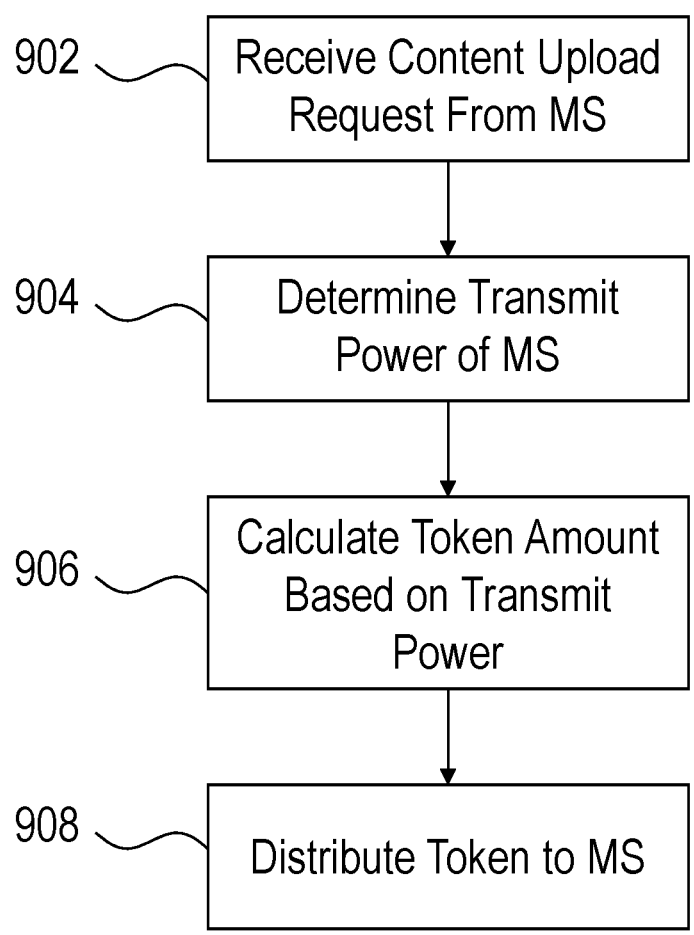
FIG. 9A is a flow chart illustrating a process for administering a transmit power credit based system.

FIG. 9A is a flow chart illustrating a process 900 for administering a transmit power credit based system, arranged in accordance with embodiments of the present disclosure. In operation 902, the BS receives a request to upload content from a MS covered in the wireless range of the BS. In operation 904, the BS determines the transmit power of the MS according to the signals received from the MS. The BS calculates the number of tokens (i.e., the token amount) to award the MS based on the transmit power of the MS in operation 906 and distributes the tokens to the MS in operation 908. In some implementations, the information regarding the transmit power of the MS may be transmitted to the MSC to be stored in the centralized database associated with the MSC.

To avoid blocking out content-rich but location disadvantaged MS's of uploading opportunities, the transmit power based credit system discussed above may be supplemented with a location fairness mechanism. For example, when a MS is at the boundaries of the wireless ranges of different BS's, the MS is likely to be associated with a low SIR and is unsuitable to transmit data. However, the MS may have desirable content to contribute.

Figure 9B:
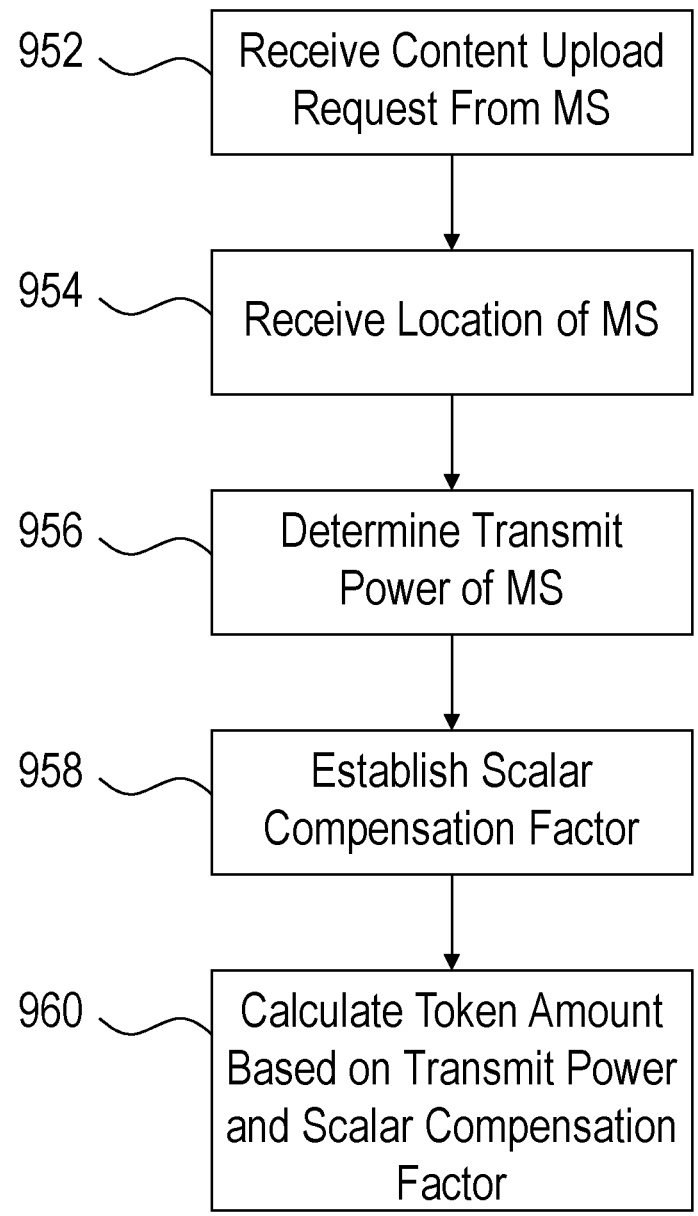
FIG. 9B is a flow chart illustrating a process for adjusting a transmit power credit based system.

FIG. 9B is a flow chart illustrating a process 950 for adjusting a transmit power credit based system, arranged in accordance with embodiments of the present disclosure. Similar to the process 900 of FIG. 9A, a BS receives a request to upload content from a MS in operation 952. The BS also receives the location of the MS and determines the transmit power of the MS in operations 954 and 956, respectively. The location of the MS helps the BS in determining the transmit power of the MS. In some implementations, the information received by the BS is further transmitted to a MSC managing the BS. The MSC, with access to a centralized database storing data from both the BS's managed by the MSC and from the MS's covered by such BS's as described above, is configured to determine whether the content the MS requesting to upload is desirable. One way for the MSC to determine the desirability of content is based on the number of requests for such content from all the MS's managed by the MSC. In operation 958, the MSC establishes a scalar compensation factor according to the desirability of the content requested to be uploaded. Then, the MSC in operation 960 calculates the appropriate amount of virtual money, or a token amount, to award the MS based on both the transmit power and also the scalar compensation factor. For example, even if the transmit power is low, suggesting the MS being in an advantaged position, the token amount may still be reduced using the scalar compensation factor if the content is considered to be undesirable. Conversely, if the transmit power if high, suggesting the MS being a disadvantaged position, the token amount may still be increased if the content is considered to be desirable.

In some alternatively implementations, a BS, instead of a MSC, may be configured to perform some or even all of the operations in the process 950. It should be apparent to a person having ordinary skills in the art to implement a system, in which the BS exchanges all the relevant data with the MSC to perform the location fairness mechanism.

FIG. 10 is a block diagram illustrating a computer program product 1000 of a software module for a MS, a BS, or a MSC, arranged in accordance with embodiments of the present disclosure. Computer program product 1000 includes one or more sets of instructions 1002 for executing the methods of the software module. Computer program product 1000 may be transmitted in a signal bearing medium 1004 or another similar communication medium. Computer program product 1000 may be recorded in a computer readable medium 1006 or another similar recordable medium 1008.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method of content transfer, the method comprising:
   requesting, by a first device, information related to a first content;
   determining, by the first device, if a direct communication between the first device and a second device can be established, wherein the direct communication between the first device and the second device can be established when a distance between the first device and the second device is determined, by the first device, to be less than a threshold value;
   when the first device determines that the direct communication between the first device and the second device can be established, receiving, by the first device, the information related to the first content via the direct communication between the first device and the second device; and
   when the first device determines that the direct communication between the first device and the second device cannot be established, receiving, by the first device, the information related to the first content via an indirect communication between the first device and the second device, wherein the indirect communication between the first device and the second device is made through a third device.

2. The method of claim 1, wherein the information related to the first content includes an availability, a tag, a keyword, or a size associated with the first content.

3. The method of claim 1, wherein the third device is a stationary device.

4. The method of claim 1, wherein the first device is a mobile device or a stationary device.

5. The method of claim 1, further comprising:
   accessing, based on the information related to the first content, by the first device, at least a portion of the first content from a centralized database.

6. A method of content transfer, the method comprising:
   receiving, by a first device, a request for information related to a first content;
   determining, by the first device, if a direct communication between a first device and a second device can be established, wherein the direct communication between the first device and the second device can be established when a distance between the first device and the second device is less than a threshold value;
   when the direct communication between the first device and the second device is established, sending, by the first device, the information related to the first content via the direct communication between the first device and the second device; and
   when the direct communication between the first device and the second device is not established, sending, by the first device, the information related to the first content via an indirect communication between the first device and the second device, wherein the indirect communication between the first device and the second, device is made through a third device.

7. The method of claim 6, further comprising:
   transmitting, by the first device, a reply signal to the second device, wherein the reply signal includes information associated with where the first content is stored.

* * * * *

UNITED STATES PATENT AND TRADEMARK OFFICE
CERTIFICATE OF CORRECTION

PATENT NO. : 9,888,510 B2
APPLICATION NO. : 14/994266
DATED : February 6, 2018
INVENTOR(S) : Chiang Page 1 of 2

It is certified that error appears in the above-identified patent and that said Letters Patent is hereby corrected as shown below:

On the Title Page

In Item (71), under "Applicant", in Column 1, Lines 1-3, delete "EMPIRE TECHONOLOGY DEVELOPMENT LLC, Wilmington, DE (US)" and insert -- EMPIRE TECHNOLOGY DEVELOPMENT LLC, Wilmington, DE (US) --, therefor.

Under "Related U.S. Application Data", in Column 1, Line 1, delete "(60)" and insert -- (63) --, therefor.

In the Specification

In Column 1, Line 18, delete "entirety." and insert -- entireties. --, therefor.

In Column 1, Line 60, delete "drawings." and insert -- drawings: --, therefor.

In Column 7, Line 61, delete "to identity" and insert -- to identify --, therefor.

In Column 8, Line 3, delete "download of the" and insert -- download the --, therefor.

In Column 9, Line 4, delete "examples the" and insert -- examples, the --, therefor.

In Column 10, Line 20, delete "alternatively" and insert -- alternative --, therefor.

In Column 11, Line 21, delete "hard disk drive," and insert -- hard disk drive (HDD), --, therefor.

In Column 11, Line 25, delete "communications link," and insert -- communication link, --, therefor.

In Column 12, Line 22, delete "recitation no" and insert -- recitation, no --, therefor.

Signed and Sealed this
Fifth Day of June, 2018

Andrei Iancu
*Director of the United States Patent and Trademark Office*

CERTIFICATE OF CORRECTION (continued)
U.S. Pat. No. 9,888,510 B2

In Column 12, Line 44, delete "general such" and insert -- general, such --, therefor.

In Column 12, Line 52, delete "general such" and insert -- general, such --, therefor.

In the Claims

In Column 14, Lines 26-27, in Claim 6, delete "second, device" and insert -- second device --, therefor.